H. C. DETERMAN.
MILKING MACHINE.
APPLICATION FILED AUG. 28, 1915.
1,194,603.
Patented Aug. 15, 1916.
3 SHEETS—SHEET 1.
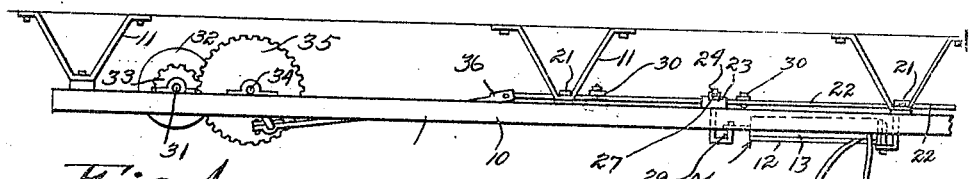
Fig. 1.
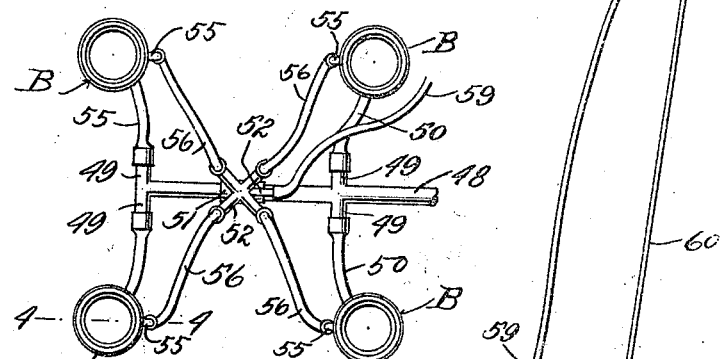
Fig. 2.
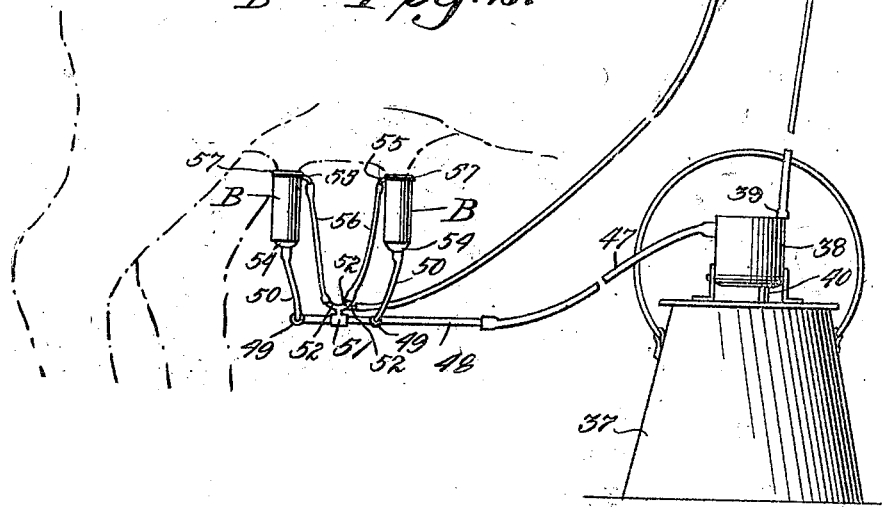
Witnesses
Inventor
H. C. Determan

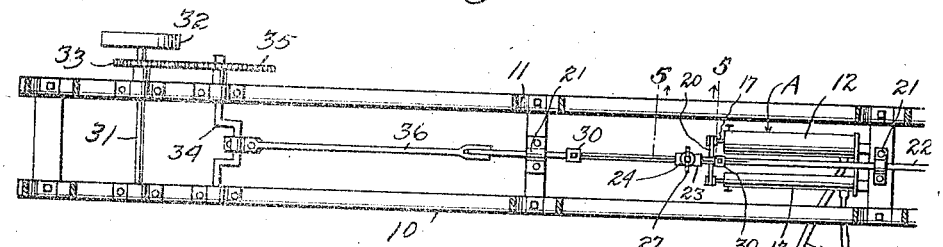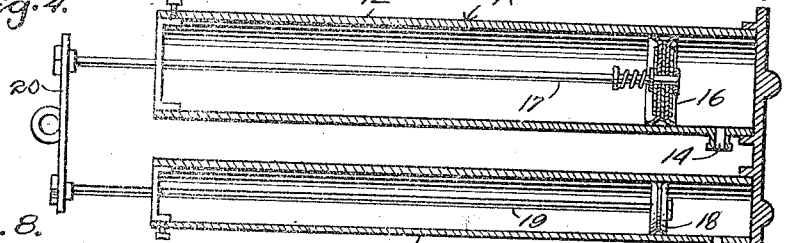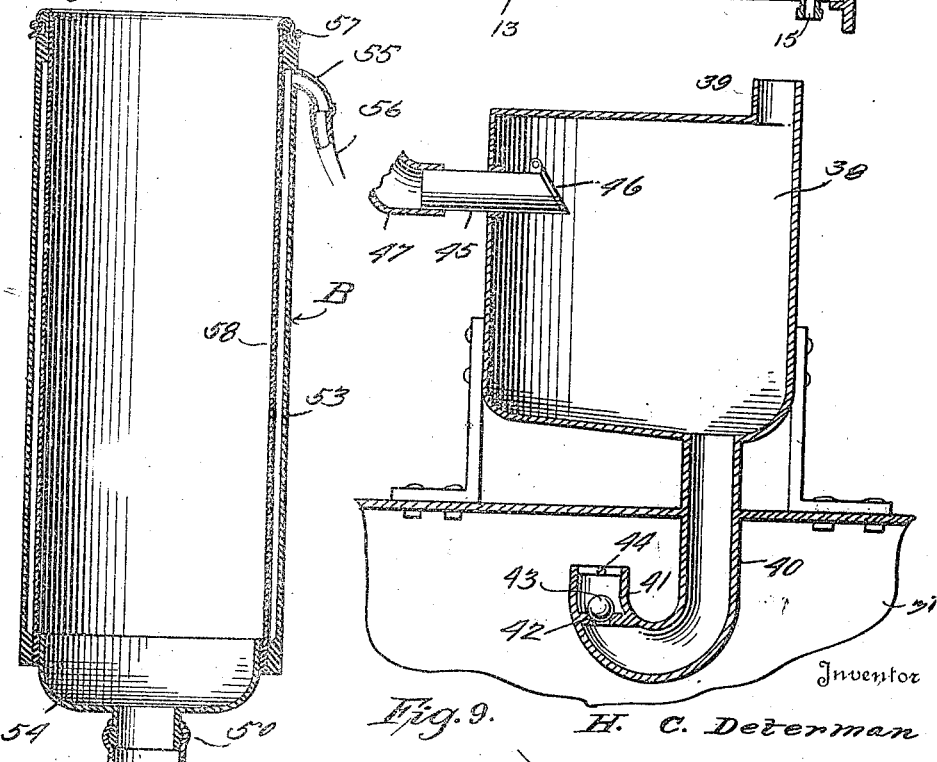

UNITED STATES PATENT OFFICE.

HENRY C. DETERMAN, OF ROCKWELL, IOWA.

MILKING-MACHINE.

1,194,603.  Specification of Letters Patent.  Patented Aug. 15, 1916.

Application filed August 28, 1915. Serial No. 47,778.

*To all whom it may concern:*

Be it known that I, HENRY C. DETERMAN, a citizen of the United States, residing at Rockwell, in the county of Cerro Gordo, State of Iowa, have invented certain new and useful Improvements in Milking-Machines; and I do hereby declare the following to be a full, clear, and exact description of the invention, such as will enable others skilled in the art to which it appertains to make and use the same.

This invention relates to milking machines.

The object of the invention is to provide a milking machine embodying an improved construction designed to render the operation thereof similar to hand milking and thereby obviate all possibility of injury to the cow.

A further object of the invention is to provide an improved form of teat cup whereby the compression thereof will progress from the top toward the bottom.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 5:
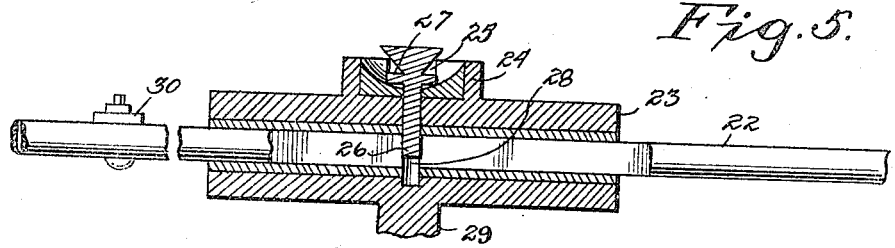
Figure 6:
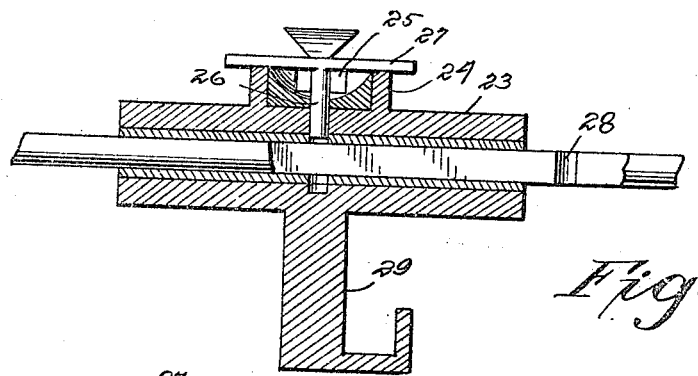
Figure 7:
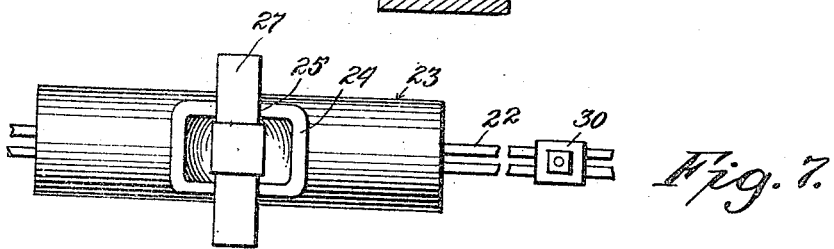

Figure 1 is a view in elevation showing the improved milking machine applied; Fig. 2, a plan view of the teat cup and adjacent parts; Fig. 3, a plan view of the pumping mechanism employed in the machine; Fig. 4, a longitudinal section through a portion of the pumping mechanism; Fig. 5, an enlarged section on the line 5—5 of Fig. 3; Fig. 6, a view similar to Fig. 5 with the parts in position to permit free sliding movement of the sleeve upon its supporting rod; Fig. 7, a plan view of what is shown in Fig. 5; Fig. 8, a vertical section through one of the teat cups employed in the machine; Fig. 9, a vertical section through the vacuum chamber which is carried by the receiving pail.

Referring to the drawings the improved milking machine is shown as comprising a pumping mechanism indicated generally at A and mounted upon a frame 10 suspended by brackets 11 from the ceiling or other suitable supports in a dairy barn. This pumping mechanism includes a pair of cylinders 12 and 13 fixed to the frame 10 the pump 13 being of smaller diameter than the pump 12 and said cylinder having air outlets and inlets 14 and 15 respectively disposed at the same ends of the cylinders. Slidably mounted in the cylinder 12 is a piston 16 to which is connected one end of a piston rod 17. Slidably mounted in the cylinder 13 is a piston 18 to which is connected one end of a piston rod 19. The rods 17 and 19 are slidably engaged in corresponding ends of respective cylinders and are connected by a yoke 20. Slidably mounted upon the frame 10 in suitable guides 21 is a rod 22 and slidably engaged on this rod is a sleeve 23 having a boss 24 formed thereon and provided with a transverse groove 25. Slidably engaged in the sleeve 23 is a pin 26 having a cross arm 27 adapted to rest either upon the outer end of the boss 24 or to seat in the groove 25. When the cross arm 27 is seated in the groove 25 the pin can be engaged through a transverse passage 28 in the rod 22 and thus connect the sleeve to the rod. Depending from the sleeve 23 is a bracket 29 which is suitably engaged with the yoke 20 so that reciprocation of the sleeve 23 will effect simultaneous reciprocation of the pistons 16 and 18. Adjustably mounted on the rod 22 on either end of the sleeve 23 are stops 30. When the sleeve 23 is connected to the rod 22 it will be obvious that the stroke of the pistons 16 and 18 will be equal to the stroke of the rod 22. When the sleeve 23 is loose on the rod 22 it will be obvious that the stroke of the pistons 16 and 18 can be varied by adjusting the stops 30. Rotatably mounted on the frame 10 is a shaft 31 having fixed thereon a belt wheel 32 and a gear 33. Through the medium of the belt wheel 32 the shaft 31 may be connected with a suitable source of power. Also rotatably mounted on the frame 10 is a crank shaft 34 upon which is fixed a gear 35 meshing with the gear 33. The crank shaft 34 is connected by a pitman 36 with the adjacent end of the rod 22. By this construction it will be obvious that the rotation of the shaft 31 will effect the necessary reciprocation of the pistons 16 and 18.

The improved milking machine further comprises a pail 37 upon the top of which is mounted a casing 38 having an outlet 39 in the top thereof. Depending from the casing 38 and extending through the top of the pail 37 is a tubular member 40 the lower end of which is curved laterally and upwardly as at 41. Disposed within the lower end of the member 40 is a valve seat 42 with which coöperates a ball valve 43 normally held to said seat by gravity. The ball valve 43 is secured against disengagement from the tubular member 40 by cross arms 44 mounted in the free end of the member 40. Extending through the side wall of the casing 36 is a pipe 45 the inner end of which is normally closed by a gravity valve 46. Engaged over the outer end of the pipe 45 is one end of a flexible pipe 47. The other end of this pipe 47 is engaged over a pipe 48 having lateral branches 49. Engaged over the outer end of each branch 49 are pipes 50 and the outer ends of these pipes 50 are connected respectively with teat cups B. Mounted on the pipe 48 between the branches 49 is a bracket 51 which supports a plurality of intercommunicating pipes 52 for a purpose that will presently appear.

Each of the teat cups B comprises an outer rigid shell 53 including a bottom member 54 having a reduced extension over which a respective pipe 50 is engaged. The upper end of the shell 53 is provided with an outlet 55 and engaged over this outlet is a pipe 56 having its opposite end engaged over one of the pipes 52. Disposed within the shell 53 is a rubber tubular member 58. The upper end of this member is engaged over the upper end of the shell 53 and secured in place by a binding wire 57. The lower end of the member 58 is clamped between the shell 53 and bottom member 54. One of the pipes 52 is connected by a flexible pipe 59 with the outlet 15 of the cylinder 13, while the casing 38 is connected to the interior of the cylinder 12 by means of a pipe 60 one end of which is engaged over the outlet 39 while the other end thereof is engaged over the outlet 14 of the cylinder 12.

In operation it will be obvious that when the pistons in the cylinders 12 and 13 are moved to the right in Fig. 4 pressure will be exerted through the pipes 59 and 60. The pressure created in the casing 38 will be prevented from entering the pipe 47 by the valve 46. The pressure in the pipe 59 will be transmitted to the cups B and collapse the member 58. When the pistons are moved to the left in Fig. 4 suction will be created in the casing 38 and the valve 46 opened by the flow of milk from the cups B. At the same time the air between the shell 53 and member 58 will be exhausted and the member 58 will return to its normal position. On the next stroke of the pistons the pressure created in the casing 38 will force the milk therein to the pail 37.

What is claimed is:—

1. In a milking machine the combination of a receptacle, a casing mounted on the receptacle, a tubular extension depending from the casing, means for closing the tubular member under the influence of a vacuum in the casing, and for opening the tubular member under the influence of pressure within the casing, a pipe engaged through the wall of the casing and having its inner end closed by a gravity valve, teat cups, connection between the last named pipe and the interior of the teat cups, and means for successively forming a vacuum in the casing and introducing compressed air into the casing.

2. In a milking machine, the combination of a receptacle, a casing mounted on the receptacle, a tubular extension depending from the casing, a valve in the tubular extension opened by air pressure within the casing and closed under the influence of a vacuum within the casing, a pipe engaged through the wall of the casing, and a gravity valve closing the inner end of said pipe.

3. In a milking machine the combination of a receptacle, a casing mounted on the receptacle, connections between the casing and the receptacle, teat cups, a pair of pumps having air inlets and outlets at the same end thereof respectively, one of said pumps having a smaller diameter than the other, means for operating the pistons of the pumps in unison, connections between the pumps having the smaller diameter and the teat cups, connections between the pump having the larger diameter and the casing, and connections between the teat cup and the casing.

In testimony whereof I affix my signature in the presence of two witnesses.

HENRY C. DETERMAN.

Witnesses:
Jos. Gallagher,
M. Johnson.